United States Patent
Nosker et al.

(10) Patent No.: US 7,851,536 B2
(45) Date of Patent: Dec. 14, 2010

(54) FLAME-RETARDANT COATING

(75) Inventors: Thomas Nosker, Stockton, NJ (US);
Mark Mazar, Piscataway, NJ (US);
Jennifer Lynch, Franklin Park, NJ (US);
Patrick Nosker, Stockton, NJ (US)

(73) Assignee: Rutgers, The State University, New Brunswick, NJ (US)

( * ) Notice: Subject to any disclaimer, the term of this patent is extended or adjusted under 35 U.S.C. 154(b) by 87 days.

(21) Appl. No.: 11/684,568

(22) Filed: Mar. 9, 2007

(65) Prior Publication Data
US 2007/0173583 A1 Jul. 26, 2007

Related U.S. Application Data

(63) Continuation-in-part of application No. PCT/US2006/035861, filed on Sep. 15, 2006.

(60) Provisional application No. 60/716,938, filed on Sep. 15, 2005.

(51) Int. Cl.
C08K 3/22 (2006.01)
(52) U.S. Cl. ...................... 524/436; 524/437
(58) Field of Classification Search ................. 524/436, 524/437
See application file for complete search history.

(56) References Cited

U.S. PATENT DOCUMENTS

| | | | |
|---|---|---|---|
| 3,560,253 A | 2/1971 | Ashton | |
| 4,567,096 A * | 1/1986 | Piltingsrud et al. | 428/315.5 |
| 5,650,224 A | 7/1997 | March et al. | |
| 5,977,271 A * | 11/1999 | McKay et al. | 526/170 |
| 6,084,008 A | 7/2000 | Liu | |
| 6,153,674 A * | 11/2000 | Landin | 524/35 |
| 6,511,756 B1 | 1/2003 | Obuchi et al. | |
| 6,548,157 B2 * | 4/2003 | Ghahary | 428/319.3 |
| 6,849,338 B2 * | 2/2005 | Clemens et al. | 428/413 |
| 2001/0046562 A1* | 11/2001 | Whitefield et al. | 427/372.2 |
| 2004/0002559 A1 | 1/2004 | Troutman et al. | |
| 2004/0039098 A1* | 2/2004 | Belmares et al. | 524/449 |
| 2004/0175407 A1* | 9/2004 | McDaniel | 424/423 |
| 2006/0281831 A1 | 12/2006 | Ghanary | |

OTHER PUBLICATIONS

The Condensed Chemical Dictionary, Tenth Edition (HAWLEY) 1981, p. 27.

* cited by examiner

Primary Examiner—Peter Szekely
(74) Attorney, Agent, or Firm—Fox Rothschild LLP; Sarah Klosek; Peter J. Butch, III

(57) ABSTRACT

A flame-retardant coating composition, which includes a cross-linked thermosetting polymer and a metal hydroxide. A precursor composition for use in preparing the flame retardant-coating is also presented, wherein the precursor composition includes a cross-linked thermosetting polymer varnish, a metal hydroxide, an alcohol, and water. A method for coating an article with a flame-retardant coating layer and articles incorporating the flame-retardant coating are also presented.

6 Claims, 7 Drawing Sheets

FLAME-RETARDANT COATING

CROSS-REFERENCE TO RELATED APPLICATIONS

This application is a continuation-in-part of International Application No. PCT/US06/35861 designating the United States and filed Sep. 15, 2006, which in turn claims priority under 35 U.S.C. §119(e) to U.S. Provisional Application Ser. No. 60/716,938, filed Sep. 15, 2005. The disclosures of both applications are incorporated herein by reference.

BACKGROUND OF THE INVENTION

In the past, fire proofing plastic involved embedding flame-retardant particles directly into the resin matrix. The technique is fine for materials which are not meant to bear load. However, the amount of flame-retardant particles needed to be effective in higher mass objects, for example plastic lumber, is too high. Disruption of the networks within a plastic significantly affects the strength and elastic modulus. Therefore, embedded particles are suitable for thinner products, for example casings for electronics and dash boards for cars. However, for structural applications of plastic a different approach must be considered to reduce the threat of fire.

Because fire is a surface phenomenon, coatings that sufficiently adjust a surface's characteristics in favor of fire resistance are important. Because the coating represents the only barrier between the plastic fuel and a possible fire source, it must remain effective throughout the fire; delaying ignition of the plastic; and hindering propagation.

SUMMARY OF THE INVENTION

The present invention is directed to a flame-retardant coating layer, which includes a cross-linked thermosetting polymer and a metal hydroxide. Optionally, the coating layer also includes a blowing agent. A precursor composition for use in preparing the flame-retardant coating is also presented, wherein the precursor composition includes a cross-linked thermosetting polymer varnish, a metal hydroxide, an alcohol, and water. A method for coating an article with a flame-retardant coating layer and articles incorporating the flame-retardant coating are also presented.

DETAILED DESCRIPTION OF THE INVENTION

Figure 1:
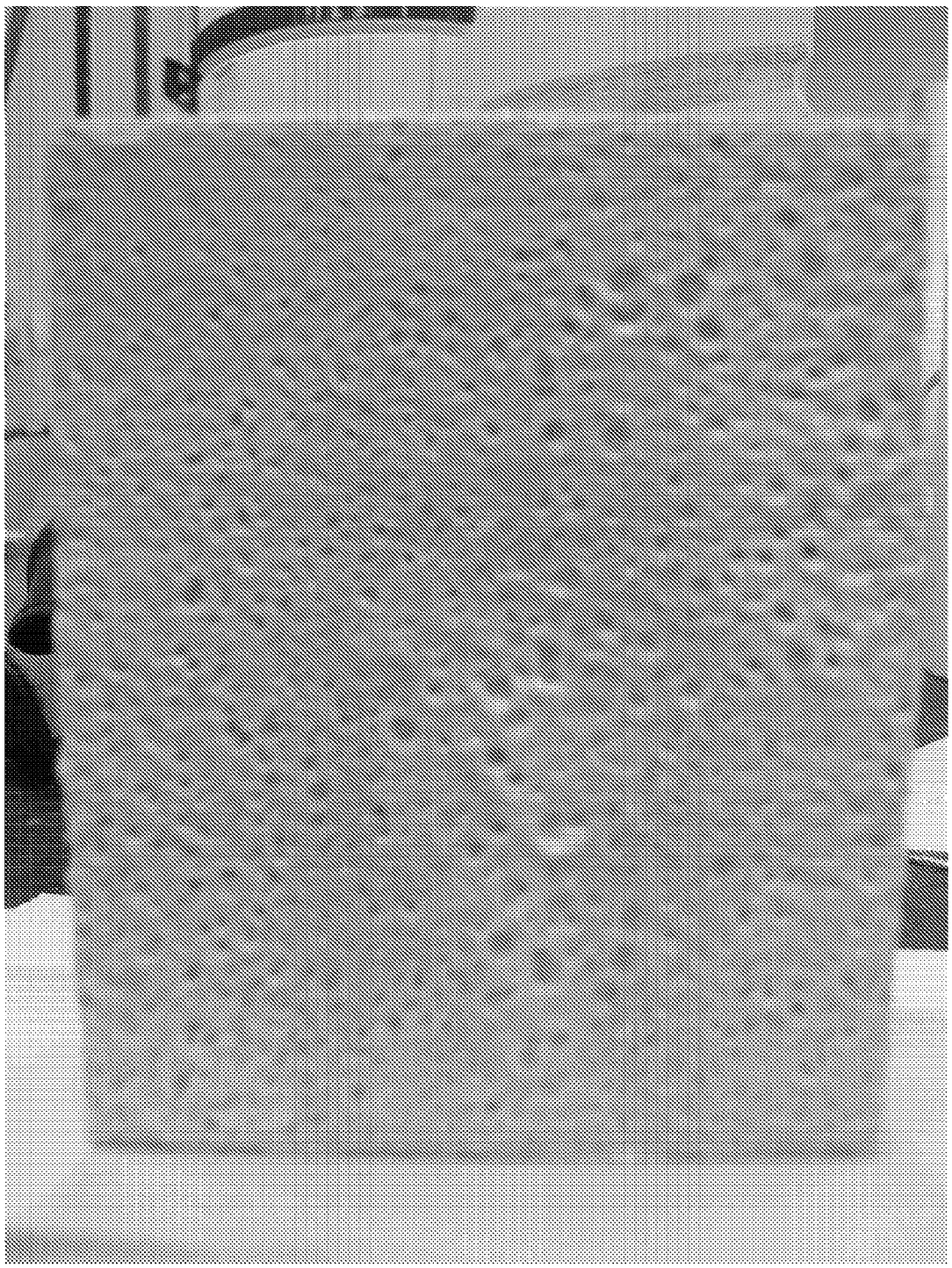
FIG. 1 shows an article following coating application.
Figure 2:
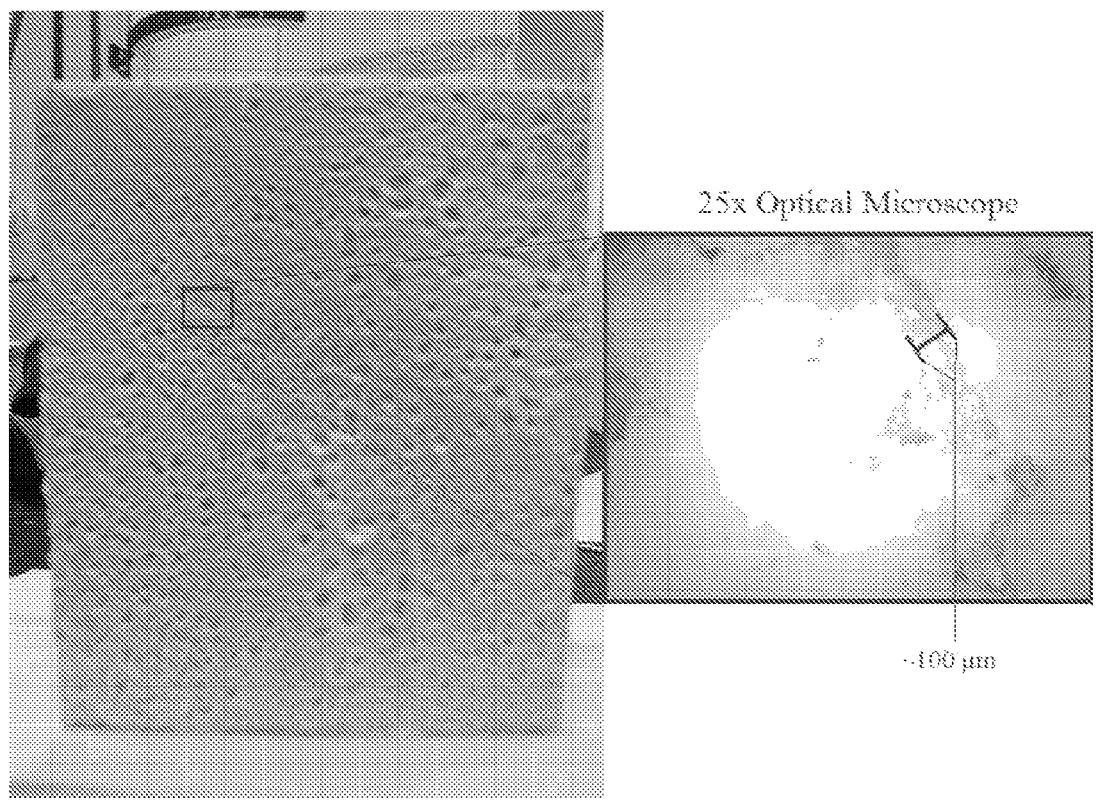
FIG. 2 provides an enlarged view of the coated article after drying.

The cross-linked thermosetting polymer can be applied in its cross-linked state or cross-linked after application upon exposure to ambient conditions of light (visible or UV), heat, oxygen, or moisture. Cross-linked polymers useful in the present invention are capable of being loaded with at least one metal hydroxide. Examples of suitable polymers include polyurethanes, alkyd polyesters, cross-linked polyacrylates, and the like.

A composition of the present invention is formulated by combining at least one metal hydroxide, alcohol, and water with a varnish solution of the polymer. The term "varnish" is defined according to its well-understood meaning as a combination of a drying oil, resin (e.g. the cross-linked thermosetting polymer) and a solvent. The solvent base of the varnish used in the present invention is preferably non-aqueous. A preferred amount of varnish in the precursor composition is from about 25% to about 35% by weight of the total composition. A preferred amount of polymer in the final coating is from about 40% to about 60% by weight of the final coating.

Suitable metal hydroxides for inclusion in the polymer are those capable of providing a flame-retardant effect. For example, magnesium hydroxide ($Mg(OH)_2$) is a non-toxic flame retardant whose decomposition is endothermic and follows the reaction below:

$$Mg(OH)_2 \rightarrow MgO + H_2O$$

$$\Delta H = -1372.35 \text{ joules (1.30 BTU) per gram}$$

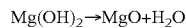

The products of decomposition are non-toxic. Further, both magnesium hydroxide and magnesium oxide are alkaline, which can reduce acidic, corrosive gas emissions from a substrate coated with the composition of the present invention. Water, produced by the decomposition, has the potential to change to steam: absorbing 2259.36 joules (2.14 BTU) per gram at 100°. The steam interferes with oxygen gas, displacing it and reducing flammability. Additionally, the magnesium oxide ceramic acts as a thermal barrier, blocking and deflecting heat and flame from penetrating to the substrate below the coating. Aluminum hydroxide ($Al(OH)_3$) behaves in the same manner. Therefore, preferred metal hydroxides include $Mg(OH)_2$ and $Al(OH)_3$. A preferred amount of metal hydroxide in the precursor composition is from about 25% to about 35% by weight of the total composition. A preferred amount of metal hydroxide in the final coating is from about 40% to about 60% by weight of the final coating.

Alcohol useful in the present invention includes, for example, isopropyl alcohol, 2-propanol, and the like. A preferred amount of alcohol in the precursor composition is from about 20% to about 30% by weight of the total composition.

Alternatively, regular over-the-counter rubbing alcohol (70% 2-propanol by volume) can also be used as long as one takes the water content into account by quantifying the amount of water in the alcohol solution. If necessary, water is added to the precursor composition in addition to the water contributed by the alcohol solution. Similarly, magnesium hydroxide may be used in slurry form just so long as one determines the water content of the slurry and adds any necessary additional water to the precursor composition. The total water content of the precursor composition, including water contributed by an alcohol solution and/or a magnesium oxide slurry, is from about 15% to about 25% by weight of the total composition.

Optionally, a blowing agent is combined with at least one metal hydroxide and a varnish solution of the polymer to form a composition according to the present invention. A preferred amount of varnish in a blowing agent-containing precursor composition is from about 45% to about 65% by weight of the total composition, with a more preferred amount being 52% by weight of the total composition. A preferred amount of polymer in the final coating is from about 45% to about 65% by weight of the final coating, with a more preferred amount being 50% by weight of the total final coating composition. A preferred amount of metal hydroxide in a blowing agent-containing precursor composition is from about 25% to about 45% by weight of the total composition, with a more preferred amount being 40% by weight of the total composition. A preferred amount of metal hydroxide in the final coating is from about 25% to about 45% by weight of the total composition, with a more preferred amount being 42% by weight of the total final coating composition.

It is believed that the blowing agent retards crosslinking, and thus imparts increased flexibility and toughness to the coating, while not sacrificing adhesion. The increased flexibility allows the coating to bend with a coated article at lower than typical temperatures and resist damage from impacts. The exposed surface cures first while the underlying layer remains viscous due to the presence of the blowing agent. Rheology results indicate that the viscosity of the underlying layer increases with curing time.

Suitable blowing agents for optional inclusion in the polymer include chemical and physical blowing agents. Preferred chemical and physical blowing agents are those that do not adversely react with the other components in the composition and produce approximately 200-220 cc of gas per gram at between 300° C. and 350° C. Examples preferred blowing agents include azodicarbonamide and water-saturated zeolites.

A blowing agent-containing precursor composition preferably includes a blowing agent in an amount of from about 6% to about 10% by weight of the total composition, with a more preferred amount being 8% by weight of the total composition. A blowing agent-containing coating composition preferably includes a blowing agent in an amount of from about 6% to about 10% by weight of the total final coating composition, with a more preferred amount being 8.5% by weight of the total final coating composition.

Due to the viscosity of the mixtures of the present invention, heavy duty mixing equipment may be used to achieve a homogeneous state. In one embodiment, a hammer drill is used in conjunction with a dual bladed agitator designed to blend paint and drywall mud.

Another aspect of the current invention includes an article, wherein at least a portion is coated with a composition, which includes a cross-linked thermosetting polymer and a metal hydroxide. Optionally, the coating further includes a blowing agent. Another embodiment includes an article, wherein at least a portion is coated with a composition, which includes a cross-linked thermosetting polymer, a metal hydroxide, an alcohol, and water.

Suitable substrates for the coated article include, for example, thermoplastics, thermoplastic composites, polyethylene, wood, stone, metal, ceramics, and the like. Preferred substrates include thermoplastics and thermoplastic composites. For example, U.S. Pat. Nos. 6,191,228, 5,951,940, 5,916,932, 5,789,477, and 5,298,214 disclose structural recycled plastic lumber composites made from post-consumer and post-industrial plastics, in which polyolefins are blended with polystyrene or a thermoplastic coated fiber material such as fiberglass. The disclosures of all five patents are incorporated herein by reference.

The coated article can have any shape or form, for example, a round cross-section, a rectangular cross-section, an hourglass cross-section, a sheet form, or a combination thereof. Exemplary forms for plastic composites are disclosed in U.S. Application No. 60/486,205 filed Jul. 8, 2003, U.S. Application No. 60/683,115 filed May 19, 2005, U.S. application Ser. No. 10/563,883 filed Jan. 9, 2006, and International Application No. PCT/US06/19311 filed May 19, 2006. The disclosures of all of which are incorporated herein by reference. In one embodiment, the article is an L-Beam, I-Beam, a C-Beam, a T-Beam, or a combination thereof.

Exemplary articles suitable for coating with the composition of the present invention include, but are not limited to, railroad ties, plastic piping, lumber, sheet piling, boat hulls, pick-up truck beds, and gasoline canisters.

Another embodiment includes a method for coating an article with a flame-retardant coating layer, which includes combining a metal hydroxide with a cross-linked thermosetting polymer varnish to form a mixture; combining water and an alcohol to form a solution; combining the mixture with the solution to form a coating precursor composition; and applying the composition to at least a portion of the article surface to form a coating layer, so that the coating layer develops cracks after drying. One embodiment includes a coated article prepared according to this method.

Another method for coating an article with a flame-retardant coating layer, includes combining a metal hydroxide with a blowing agent to form a well-blended mixture; combining the mixture with a cross-linking thermosetting polymer varnish to form a blowing agent-containing precursor composition; and applying the composition to at least a portion of the article surface to form a coating layer.

In one embodiment, the coating is applied to the article by dip coating. In this embodiment, the article is immersed in the coating composition and removed to allow excess coating composition to drain from the article's surface to create a uniform coating layer. The coating is then cured. The dip coating procedure can be repeated until the desired thickness of the coating is reached. The time interval between dipping can be adjusted to control the rate of curing of underlying layers.

In another embodiment, the coating is applied to the article by spraying. In one embodiment, the coating is sprayed onto a horizontal or vertical surface of an article and allowed to set prior to coating another side of the article. Spraying equipment having high suction is preferable. When applying the coating, an even layer is not critical but the coating should be thick enough to obstruct vision of the underlying surface. Spraying creates a rough texture with random features of varying thickness which promotes crack formation during drying. (FIG. 1) This eliminates any chance of significant spalling; rather, small regions of coating form, due to cracking, and remain local to their initial sub-melt temperature positions, extending the retardant's effectiveness.

The coating shown in FIG. 1 is relatively even, but the crater-like topology of the surface is evident. During drying, the polymer adheres to the substrate, which anchors it. Because much of the coating is made up of volatiles, shrinkage is substantial. The texture of the surface in combination with the coating's bond to the substrate causes cracking, which leads to the formation of "thermoset plates" or islands containing the flame-retardant composition.

Figure 3:
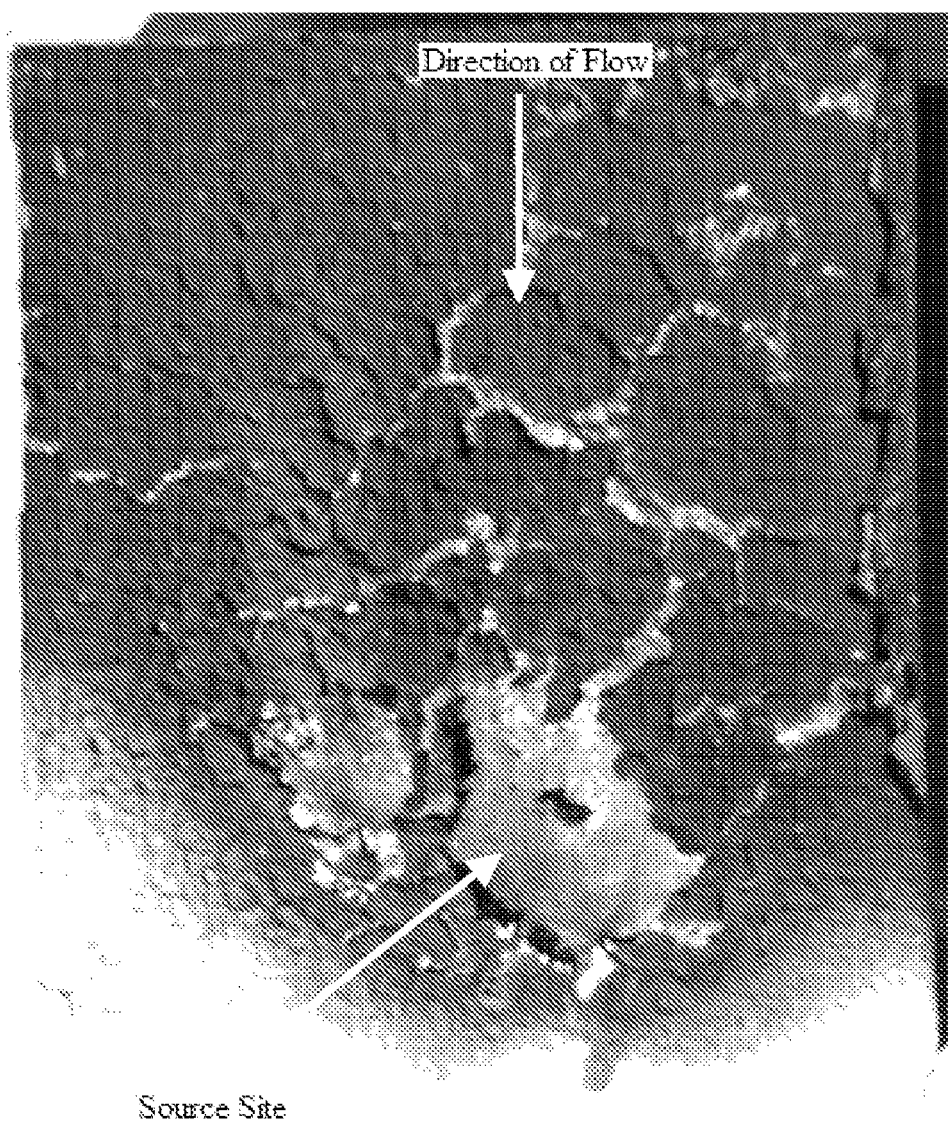
FIG. 3 shows the coated article following a flame test.

In addition, coated plastic with vertical orientation receives an added benefit: flame and heat, traveling up due to buoyant force, cause the plastic above the source to melt, which then flows down due to gravity and carries the flame retardant towards the source; thereby actively suppressing and extinguishing the fire. Surface tension prevents the thermoset plates, which resemble continents, from separating from the hot liquid plastic, allowing it to "float" on the surface. (FIG. 3). Following exposure to a flame, the majority of the coating islands remain in their initial positions. (FIG. 3). Had the article in FIG. 3 not been coated, the entire front face would have dripped from the substrate by the test's end. It should be noted that situations involving a flame traveling up along a vertical surface represent the worst case scenario. This specific case is actively suppressed just by the nature of the coating.

The following non-limiting examples set forth herein below illustrate certain aspects of the invention.

EXAMPLES

Example 1

Coating Preparation Using Magnesium Hydroxide Slurry

Isopropyl alcohol (70% isopropyl alcohol by volume), magnesium hydroxide slurry (Flomag® H, Martin Marietta Magnesia Specialties Inc., Baltimore, Md.), and polyurethane varnish (Minwax® Fast-Drying Polyurethane, Sherwin-Williams Co., Cleveland, Ohio) are mixed in a ratio of 1:1:1 by volume. To insure that the polyurethane does not cure prematurely, the isopropyl alcohol and magnesium hydroxide slurry are mixed and kept separately until needed.

Example 2

Coating Preparation Using Magnesium Hydroxide Powder

Polyurethane varnish is first measured out and mixed. Magnesium hydroxide powder is added during mixing. Next, water (7.8% by weight of composition) and 70% isopropyl alcohol by volume (34.7% by weight of composition) are separately combined. In the third step, the liquid prepared in step two is added to the poly-urethane varnish/Mg(OH)$_2$ mixture of step one. The mass percents of the components can be found in Table 1.

TABLE 1

| Component | Percent by Weight of Total Composition |
| --- | --- |
| Isopropyl alcohol (70% v/v) (24.3% alcohol; 10.4% water) | 24.3% |
| Polyurethane varnish | 27.8% |
| Magnesium hydroxide powder | 29.7% |
| Water (7.8% + 10.4% from alcohol solution) | 18.2% |

Example 3

Coated Composite Plastic Plank

A six-inch square composite plastic plank was coated with the composition prepared in Example 2. A propane torch was applied to the coated plastic and to an uncoated control plastic for two minutes such that the one-inch inner cone of the flame just reached each sample's surface. Brief removal of the torch, in thirty-second intervals, was used to determine whether each sample's surface had achieved self-sustaining combustion.

Coating a sample with the composition of Example 2 prolongs the time it takes to achieve self-sustaining combustion (Table 2).

TABLE 2

| Time (s) | Uncoated | Coated |
| --- | --- | --- |
| 30 | N | N |
| 60 | Y | N |
| 90 | Y | N |
| 120 | Y | Y |

Y or N: Indicates self-sustaining combustion

Example 4

Coated Plastic Railroad Ties

An oxy-acetylene torch was aimed at the bottom corner of a plastic composite railroad tie. Two types of plastic composite railroad ties were used: TieTek™ Tie (TieTek, Marshall, Tex.) and (2) 32% polystyrene/68% polyethylene railroad tie ("Poly"). Four of each type of railroad tie were prepared for fire testing, two coated and two uncoated, and assembled into three test groups as indicated below in Table 4.

Application of the torch was attempted in the following time increments: 20, 35, 60, 120, and 300 seconds. However, because of malfunctioning torches and rain, only a portion of the total tests were conducted. After each interval, the torch was removed and the ties were allowed some time in order to determine whether they would self-extinguish. If they did, the time of this occurrence was recorded. If they did not, the time they were extinguished with water was recorded. The results are listed below in Table 4:

TABLE 4

| | | | Flame Application Duration (sec.) | | | | |
| --- | --- | --- | --- | --- | --- | --- | --- |
| Test | Tie | Treatment Product | 20 | 35 | 60 | 120 | 300 |
| | | | Flame Out Time (sec.) | | | | |
| A | TieTek ™ | None | 0 | 2 | 200 | 270 | 245 |
| | Poly | None | Ext | Ext | Ext | Ext | Ext |
| B | TieTek ™ | None | # | # | # | # | # |
| | TieTek ™ | FxPl | # | # | # | # | 75(285) |
| | TieTek ™ | Example 2 | # | # | # | # | 6(260) |
| C | Poly | None | 0 | 68 | Ext | Ext | Ext |
| | Poly | FxPl | 0 | Ext | Ext | Ext | Ext |
| | Poly | Example 2 | 0 | 13 | Ext | Ext | Ext(215) |

\# - Indicates that the test was not conducted
Ext - Indicates that the fire was extinguished with water
(time) - Indicates the torch malfunctioned and the time the flame was prematurely removed
FxPl - Indicates a proprietary aircraft manufacturer's coating Discussion Tests conducted in Examples 3 and 4 indicate that the flame retardant coating wards off the development of self-sustaining combustion. Furthermore, the 35 second on the Poly ties shows that the ties coated with the composition of Example 2 self-test extinguished while the Fx P1 coated tie had to be put out with water. Reinforcing this point, the 300 second test on TieTek™ ties shows the ties coated with the composition of Example 2 self-extinguishing a mere 6 seconds after the torch was removed while the tie coated with Fx P1 took 75 seconds to self extinguish.

Example 5

Coating Preparation with a Blowing Agent

Metal hydroxide powder (10 parts by mass) was evenly mixed with a blowing agent powder (2 parts by mass). This mixture was slowly added to a cross-linking thermoset varnish (13 parts by mass) while continuously mixing. The optimum percent by mass composition is approximately 52/40/8% of cross-linking thermoset varnish/metal hydroxide/blowing agent. This product must be either stored in a sealed container to avoid premature curing or applied immediately.

Example 6

Application of Blowing Agent Coating

For optimum control of coating thickness, the coating was applied at the rate of approximately 100 mL/ft$^2$, corresponding to coverage of approximately 40 ft$^2$/gal.

Example 7

Flame Testing of Blowing Agent Coating

Figure 4:
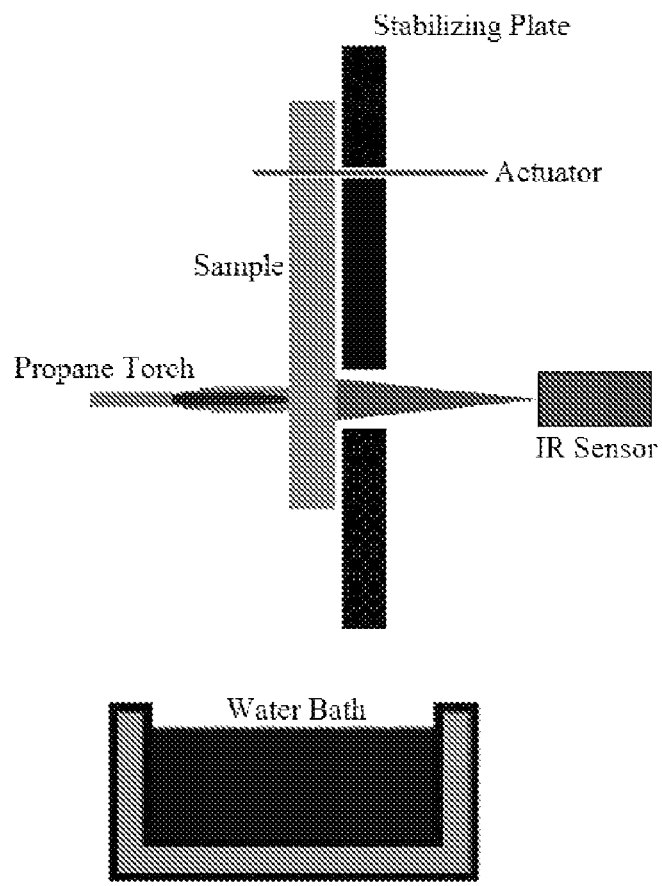
FIG. 4 is a schematic representation of a flame test set up showing a propane torch in direct contact with a blowing agent coating on a steel substrate and an IR sensor on the reverse side of the substrate aligned on the same axis as the flame.
Figure 5:
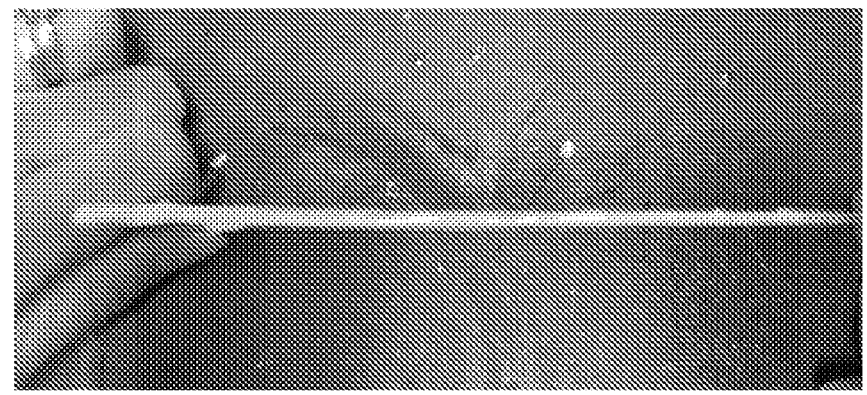
FIG. 5 is a flame test specimen showing the thickness of the steel substrate with the blowing agent coating prior to the flame test.
Figure 6:
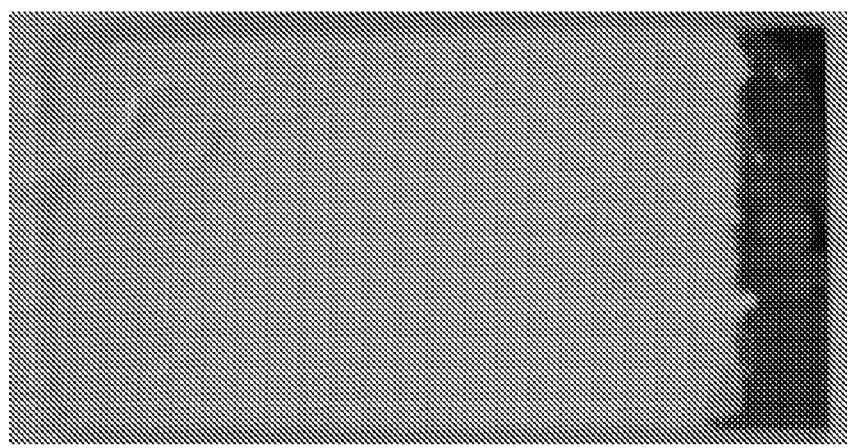
FIG. 6 is a flame test specimen showing the steel substrate with the blowing coating prior to the flame test.
Figure 7:
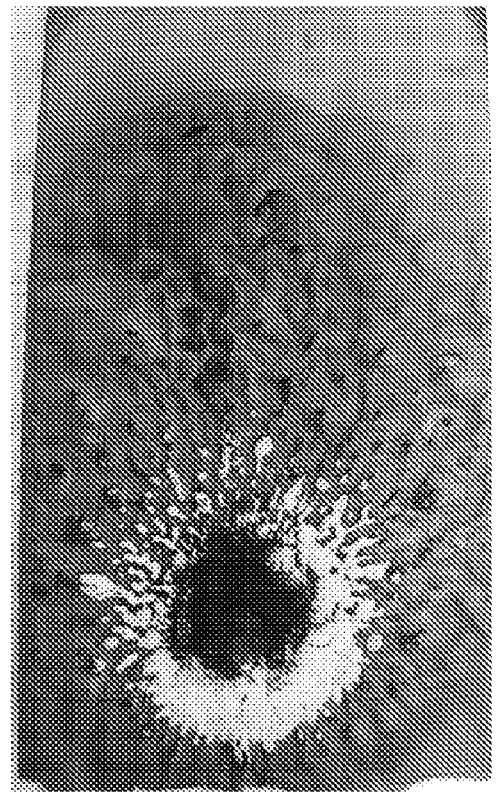
FIG. 7 is a flame test specimen showing the steel substrate with the blowing agent coating after the flame test.
Figure 8:
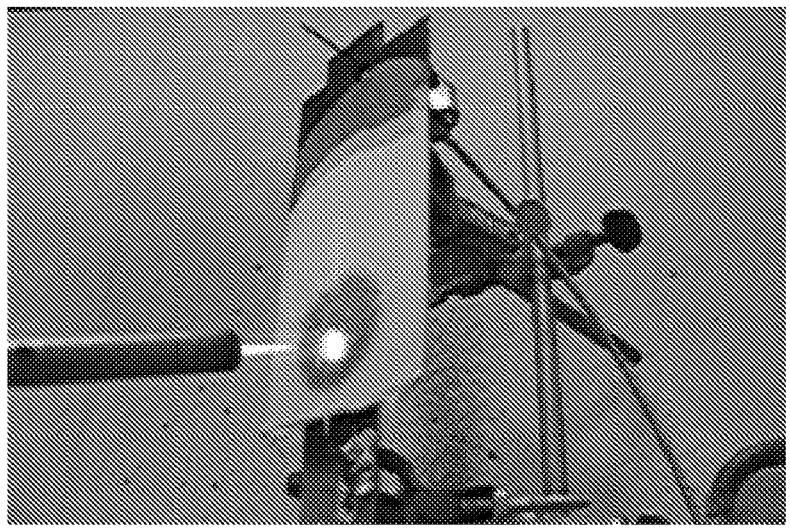
FIG. 8 depicts a flame test showing the steel substrate with the blowing agent coating subject to direct contact of a propane torch for ten minutes.
Figure 9:
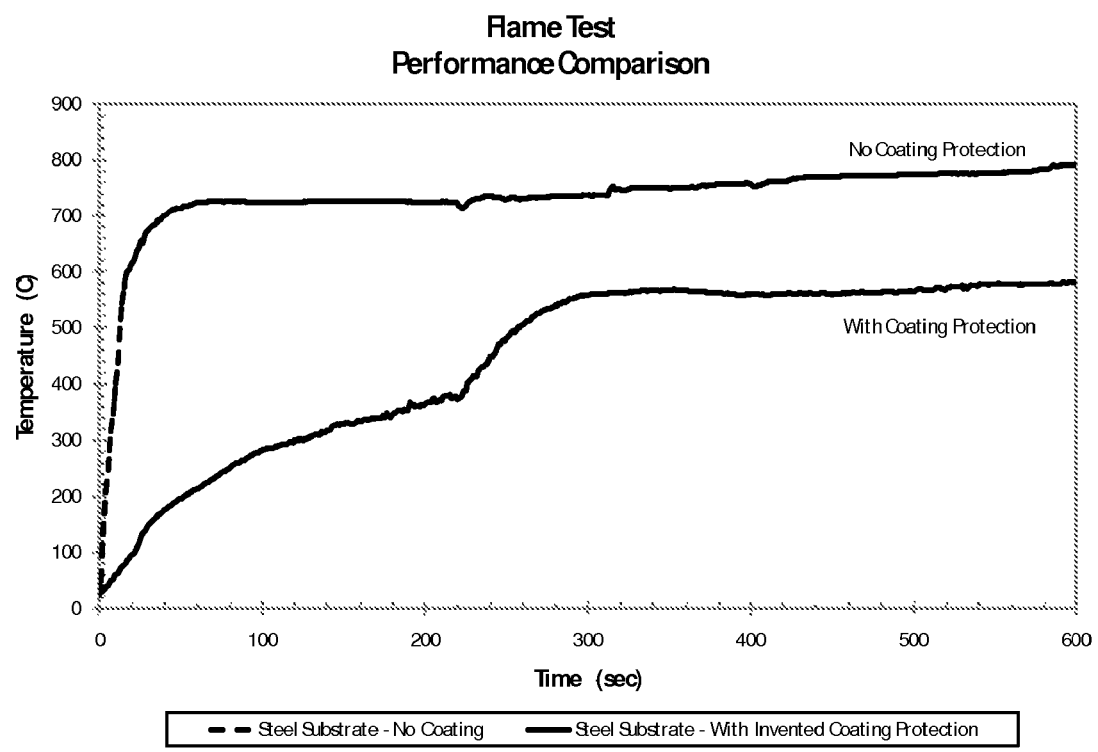
FIG. 9 is a temperature versus time plot for a flame test.

For flame testing, the coating was prepared according to Example 5 and applied to a steel coupon (76 by 152 mm) in a horizontal position and allowed to cure before testing. (FIGS. 5 and 6). The flame test employed the flame produced by a propane torch applied normal to the coated side of the specimen. An IR sensor (Omega OS550 Series Infrared Industrial Pyrometer) was aligned on the same axis as the flame and measured temperature as a function of time on the reverse side of the vertical steel coupon. A schematic of the test set-up is shown in FIG. 4. The inner cone length of the flame was adjusted to 3.175 cm. The tip of the inner cone, the hottest part of the flame, was positioned directly on the sample's surface 2.54 cm above the bottom edge and at the center across the sample width. This configuration delivered worst case scenario results for high temperature direct point heating. The adiabatic flame temperature of propane in air is approximately 1,927° C.+/−38° C. The flame was applied for a total duration of ten minutes. (FIGS. 7-9). Temperature versus time results were compared against a control specimen, an uncoated steel plate, as a point of reference.

Example 8

Rheology Testing and Results for Blowing Agent Coating

Figure 10:
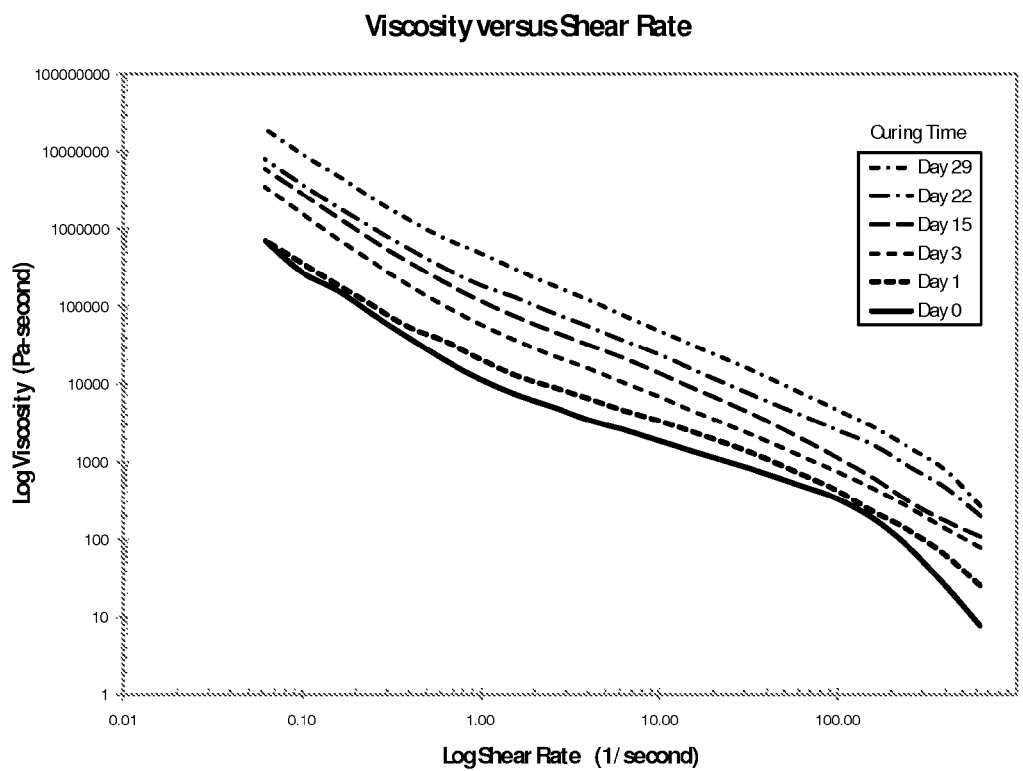
FIG. 10 provides rheological frequency sweep data showing a log-log plot of viscosity in Pascal seconds versus shear rate in per seconds at various lengths of curing time.
Figure 11:
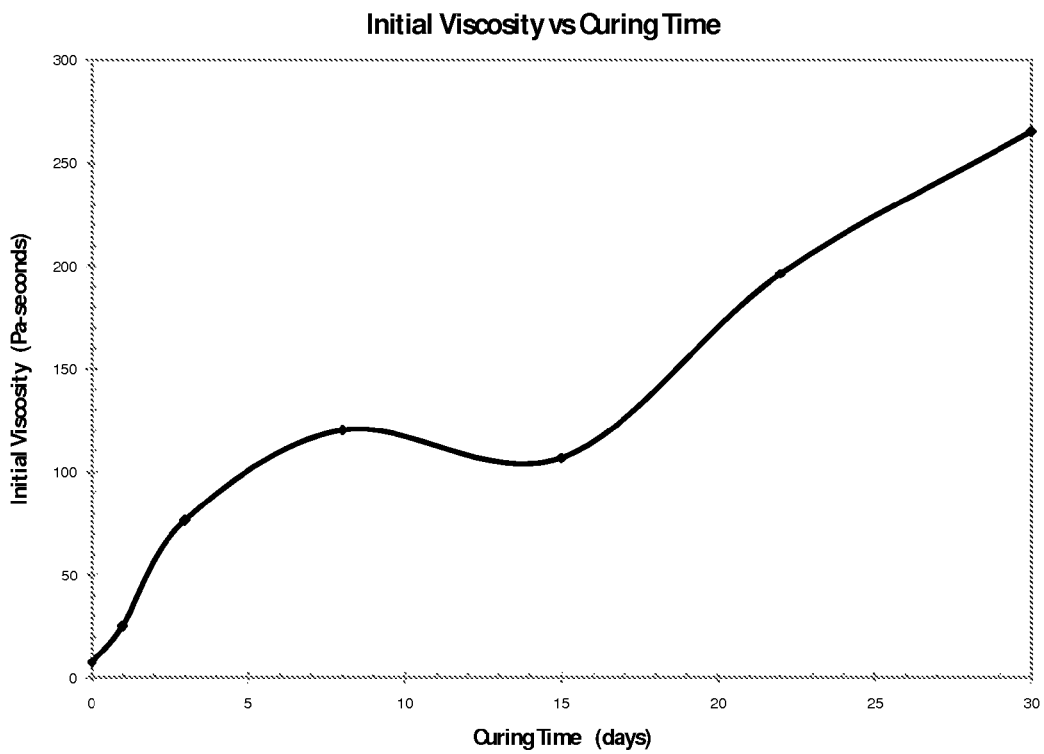
FIG. 11 provides rheological frequency sweep data showing the initial viscosity in Pascal-seconds versus curing time of the specimen in days.

The flame retardant material was prepared according to Example 5, poured into open containers (90 mm diameter with a depth of less than 10 mm), and allowed to cure for various lengths of time, including 0, 1, 3, 8, 15, 22, and 29 days. The exposed surface began to cure and harden first, while the underlying layers remained viscous due to the presence of the blowing agent that retards cross-linking. At each time interval, the cured surface layer was peeled off, the thickness of the layer was measured, and the material underneath was subjected to rheology experiments to determine the viscosity of the material beneath the cured surface layer. The Day 0 material corresponded to the initial mixture, and therefore, did not have a cured surface layer. Using a TA Instruments AR 2000 rheometer with 25 mm parallel plates at room temperature, the linear viscoelastic region was determined by a torque sweep from 1-10,000 microNm for the material at each length of curing time followed by a frequency sweep from 100-0.01 Hz at the corresponding percent strain determined from the torque sweep. A Cox-Merz mathematical transformation of the frequency sweep data provided viscosity versus shear rate results for the material at each length of curing time of 0, 1, 3, 8, 15, 22, and 29 days. Results are presented in Table 5 and FIGS. 10 and 11. Results indicate that the viscosity of the material beneath the cured surface layer increased with specimen curing time.

TABLE 5

Rheoligical viscosity data as a function of curing time

| Curing Time (days) | Initial Viscosity (Pa-second) |
| --- | --- |
| 0 | 7.6 |
| 1 | 24.9 |
| 3 | 76.5 |
| 8 | 120.3 |
| 15 | 106.8 |
| 22 | 196.3 |
| 30 | 265.0 |

The foregoing examples and description of the preferred embodiments should be taken as illustrating, rather than as limiting the present invention as defined by the claims. As will be readily appreciated, numerous variations and combinations of the features set forth above can be utilized without departing from the present invention as set forth in the claims. Such variations are not regarded as a departure from the spirit and script of the invention, and all such variations are intended to be included within the scope of the following claims.

What is claimed is:

1. A flame-retardant coating composition consisting of a cross-linked thermosetting polymer varnish, wherein the polymer is selected from the group consisting of polyurethane, alkyd polyester, and cross-linked polyacrylate; a metal hydroxide present in an amount from about 25% to about 35% by weight of the composition; an alcohol; and water.

2. The flame-retardant coating composition of claim 1, wherein said metal hydroxide is selected from the group consisting of Mg(OH)$_2$ and Al(OH)$_3$.

3. The flame-retardant coating composition of claim 1, wherein said alcohol is selected from the group consisting of isopropyl alcohol and 2-propanol.

4. The flame-retardant coating composition of claim 1, wherein said polymer varnish is present in an amount from about 25% to about 35% by weight of the composition.

5. The flame-retardant coating composition of claim 1, wherein said alcohol is present in an amount from about 20% to about 30% by weight of the composition.

6. The flame-retardant coating composition of claim 1, wherein said water is present in an amount from about 15% to about 25% by weight of the composition.

* * * * *